(12) United States Patent
McClish

(10) Patent No.: US 12,524,593 B2
(45) Date of Patent: Jan. 13, 2026

(54) ANALOG INFORMATION MODEL OBJECT CLASS DEFINITION

(71) Applicant: Microchip Technology Incorporated, Chandler, AZ (US)

(72) Inventor: Charles McClish, Lancing, TN (US)

(73) Assignee: Microchip Technology Incorporated, Chandler, AZ (US)

( * ) Notice: Subject to any disclaimer, the term of this patent is extended or adjusted under 35 U.S.C. 154(b) by 848 days.

(21) Appl. No.: 17/832,830

(22) Filed: Jun. 6, 2022

(65) Prior Publication Data

US 2023/0161938 A1    May 25, 2023

Related U.S. Application Data

(60) Provisional application No. 63/281,810, filed on Nov. 22, 2021.

(51) Int. Cl.
| | |
|---|---|
| *G06F 30/367* | (2020.01) |
| *G06F 30/3308* | (2020.01) |
| *G06F 30/373* | (2020.01) |
| *G06F 30/398* | (2020.01) |
| *G06F 119/06* | (2020.01) |

(52) U.S. Cl.
CPC ........ *G06F 30/367* (2020.01); *G06F 30/3308* (2020.01); *G06F 30/373* (2020.01); *G06F 30/398* (2020.01); *G06F 2119/06* (2020.01)

(58) Field of Classification Search
CPC .. G06F 30/367; G06F 30/3308; G06F 30/373; G06F 30/398; G06F 2119/06
USPC ............................ 716/106, 111, 136; 703/14
See application file for complete search history.

(56) References Cited

U.S. PATENT DOCUMENTS

| | | | |
|---|---|---|---|
| 7,171,642 B2* | 1/2007 | Weber ................ | G01R 31/3004 |
| 8,661,402 B2* | 2/2014 | Bhushan ............... | G06F 30/367 |
| | | | 716/132 |
| 8,949,100 B1* | 2/2015 | Cranston ............... | G06F 30/331 |
| | | | 703/14 |

(Continued)

FOREIGN PATENT DOCUMENTS

WO    WO-2012169000 A1 * 12/2012  ......... G06F 17/5036

OTHER PUBLICATIONS

Huang et al., Chinese Patent Docuemnt No. CN-111950054-A, published Nov. 17, 2020, 4 pages including abstract, claims and 1 drawing. (Year: 2020).*

(Continued)

*Primary Examiner* — Phallaka Kik
(74) *Attorney, Agent, or Firm* — SLAYDEN GRUBERT BEARD PLLC

(57) ABSTRACT

A computer-implemented method is provided including instantiating an object of an analog information model object class definition defining a net interface to a net defined in a simulated digital circuit, and a plurality of analog circuit properties. The method includes connecting the net interface of the data structure to a first net defined in a digital circuit simulation and identifying all other instances of the AIM object class definition connected to the first net defined in the digital circuit simulation of a simulated digital circuit and determining an analog voltage at and current through the first net based on the analog circuit properties of all instances connected to the first net.

20 Claims, 18 Drawing Sheets

(56) References Cited

U.S. PATENT DOCUMENTS

| | | | | |
|---|---|---|---|---|
| 8,949,753 | B1* | 2/2015 | Kolpekwar | G06F 30/367 |
| | | | | 716/106 |
| 9,009,636 | B2* | 4/2015 | Matsubara | G06F 30/367 |
| | | | | 716/106 |
| 9,286,421 | B1* | 3/2016 | Kukal | G06F 30/33 |
| 9,501,592 | B1* | 11/2016 | Kolpekwar | G06F 30/33 |
| 10,521,332 | B1* | 12/2019 | Sauer | G06F 8/34 |
| 10,878,160 | B1* | 12/2020 | Lu | G06F 30/373 |
| 11,334,702 | B1* | 5/2022 | Banerjee | G06F 30/367 |
| 11,520,470 | B2* | 12/2022 | Ziegenfuss | G06F 9/542 |
| 2001/0018647 | A1* | 8/2001 | Weber | G06F 30/367 |
| 2002/0049576 | A1 | 4/2002 | Meyer | 703/14 |
| 2006/0074626 | A1 | 4/2006 | Biswas et al. | 704/8 |
| 2006/0259879 | A1* | 11/2006 | Chetput | G06F 30/367 |
| | | | | 703/16 |
| 2009/0132983 | A1* | 5/2009 | Gass | G06F 30/3312 |
| | | | | 716/113 |
| 2012/0060133 | A1* | 3/2012 | Krishnan | G06F 30/3312 |
| | | | | 716/108 |
| 2013/0019217 | A1* | 1/2013 | Brinkmann | G06F 30/3323 |
| | | | | 716/106 |
| 2013/0326440 | A1* | 12/2013 | Chetput | G06F 30/38 |
| | | | | 716/102 |
| 2014/0089877 | A1* | 3/2014 | Salem | G06F 30/398 |
| | | | | 716/112 |
| 2020/0218756 | A1* | 7/2020 | Rawlings | G06F 16/51 |
| 2020/0293428 | A1* | 9/2020 | Zhang | G06F 11/3612 |
| 2020/0364390 | A1* | 11/2020 | Larsen | G06F 17/18 |
| 2021/0049085 | A1* | 2/2021 | Zhang | G06F 11/3698 |
| 2021/0110075 | A1* | 4/2021 | Dalloro | G06F 30/12 |
| 2023/0069588 | A1* | 3/2023 | Foelsche | G06F 30/367 |
| 2024/0036088 | A1* | 2/2024 | Belgarric | G06F 21/57 |

OTHER PUBLICATIONS

Seok, Moon Gi et al., "Framework for Simulation of the Verilog/SPICE Mixed Model: Interoperation of Verilog and SPICE Simulators Using HLA/RTI for Model Reusability," 22$^{nd}$ IEEE International Conference on Very Large Scale Integration, 6 pages, Oct. 6, 2014.

International Search Report and Written Opinion, Application No. PCT/US2022/050532, 13 pages, Mar. 28, 2023.

* cited by examiner

```
Class AIM (200):
    Properties (210):
        Net Interface (211)
        Analog Circuit Element Type (212)
        Voltage (213)
        Current (214)
        Resistance (215)
        Inductance (216)
        Capacitance (217)
        Charge (218)

Min and Max Voltage (241)
        Min and Max Current (242)
        Min and Max resistance (243)

Static Array AIM References (219)
    methods (230):
        Static Resolution (231)
        New (232)
```

FIG. 2

```
aim_if # aim_c :: LOAD, 1.0   vreg_vsscore_if   .net(vreg_vsscore) ;
aim_if # aim_c :: V_SOURCE, 900000000.0   vreg_out_ana_if   .net (vreg_out_ana) ;
`endif
aim_if # aim_c :: LOAD, 1000000.0   bg_ref_ana_if   .net (bg_ref_ana) ;
aim_if # aim_c :: LOAD, 1000.0   ibias_ana_if   .net (ibias_ana) ;
aim_if # aim_c :: LOAD, 1000000.0   vreg_sense_ana_if   .net (vreg_sense_ana) ;
aim_if # aim_c :: LOAD, 1000000.0   vreg_atest_ana_if   .net (vreg_atest_ana) ;
```

FIG. 3A

```
always @(aim.updated or en_atest_mv or vreg_atest_ana_if.is_ok)
if (en_atest_mv && vreg_atest_ana_if.is_ok) vreg_atest_ana_if.set_v(vreg_out_ana_if.voltage) ;
else
    vreg_atest_ana_if.set_v(0.0) ;
```

FIG. 3B

```
assign vdd_real = (vreg_vdd_if.is_ok && vreg_vsscore_if.is_ok) ? (vreg_vdd_if.voltage - vreg_vsscore_if.voltage) : 0.0;
```

FIG. 3C

```
static aim_c aim_nodes [int] [string];

function new( string node_name, aim_node_t node_type = LOAD, real resistance = 1000, real capacitance = 0);
    this.node_name      = node_name;
    this.node_type      = node_type;
    // Setting the resistance to a non-0 value to prevent div-by-0 type errors in the resolution function
    this.resistance     = resistance;
    this.capacitance    = capacitance;

aim_nodes [0] [node_name] = this;[]
    $display("created AIM node %s", node_name);
endfunction
```

FIG. 3D

```
Supply_nets:
    VDDIO: input
    GNDIO: input
    AVDD: input
    AGND: input
    GND_CORE: input
    VDD_CORE: output
    VREG_0: output
    VREG_1: output
macros:
    dut_i0.vreg_i0:
        vreg_vdd: VDDIO
        vreg_vssa: AGND
        vreg_vdd3: AVDD
        vreg_vsscore: GND_CORE
        vreg_out_ana: VREG_0 dut_i0.vreg_i1:
        vreg_vdd: VDDIO
        vreg_vssa: AGND
        vreg_vdd3: AVDD
        vreg_vsscore: GND_CORE
        vreg_out_ana: VREG_1 dut_i0.dig_i0.apm:
        vdd-core: VDD_CORE
        gnd-core: GND_CORE dut_i0.psw_i0:
        vreg_in_0: VREG_0
        vreg_in_1: VREG_1
        vreg_out_ana: VDD_CORE
```

FIG. 8A

```
// power net declarations
wire VDDIO;
wire GNDIO;
wire AVDD;
wire AGND;
wire GND_CORE;
wire VDD_CORE;
wire VREG_0;
wire VREG_1;

// power net AIM Initialization
`ifdef UPF_MODE
aim_upf_output_if #(aim_c : : V_SOURCE, 0.1) VDDIO_if (.net(VDDIO)) ;
aim_upf_output_if #(aim_c : : V_SOURCE, 0.1) GNDIO_if (.net(GNDIO)) ;
aim_upf_output_if #(aim_c : : V_SOURCE, 0.1) AVDD_if (.net(AVDD)) ;
aim_upf_output_if #(aim_c : : V_SOURCE, 0.1) AGND_if (.net(AGND)) ;
aim_upf_output_if #(aim_c : : V_SOURCE, 0.1) GND_CORE_if (.net
(GND_CORE)) ;
aim_upf_input_if #(aim_c : : LOAD, 9e8) VDD_CORE_if (.net(VDD_
CORE)) ;
aim_upf_input_if #(aim_c : : LOAD, 9e8) VERG_0_if (.net(VERG_0)) ;
aim_upf_input_if #(aim_c : : LOAD, 9e8) VERG_1_if (.net(VERG_1)) ;

`else aim_if #(aim_c : : V_SOURCE, 0.1) VDDIO_if (.net(VDDIO)) ;
aim_if #(aim_c : : V_SOURCE, 0.1) GNDIO_if (.net(GNDIO)) ;
aim_if #(aim_c : : V_SOURCE, 0.1) AVDD_if (.net(AVDD)) ;
aim_if #(aim_c : : V_SOURCE, 0.1) AGND_if (.net(AGND)) ;
aim_if #(aim_c : : V_SOURCE, 0.1) GND_CORE_if (.net(GND_CORE)) ;
aim_if #(aim_c : : LOAD, 9e8) VDD_CORE_if (.net(VDD_CORE)) ;
aim_if #(aim_c : : LOAD, 9e8) VREG_0_if (.net(VREG_0)) ;
aim_if #(aim_c : : LOAD, 9e8) VREG_1_if (.net(VREG_1)) ;

`endif
```

FIG. 8B

ANALOG INFORMATION MODEL OBJECT CLASS DEFINITION

This application claims priority to U.S. provisional patent application Ser. No. 63/281,810 filed on Nov. 22, 2021, which is hereby incorporated by reference in its entirety.

FIELD OF THE INVENTION

The present application relates to computer aided design and simulation systems.

BACKGROUND

Electronic circuit designers use various software tools to model, simulate, and validate designs before building physical circuits. Digital design tools often use a design language called Verilog to model digital circuits much like a software programmer writes code. Analog design tools often use SPICE, which is a comparable programming language for analog circuits. Computer aided design packages are not well-equipped to handle mixed analog and digital designs. Digital circuits are typically sequentially modelled with discrete states and defined time windows for signals to settle. Digital circuits are often processed one component (or equation) at a time with outputs passed to the next equation in sequence. In contrast, analog circuits are typically modelled with continuous waveforms both in voltage/current levels and over time. In an analog circuit model, all connected components are simulated simultaneously to obtain an accurate understanding of the circuit behavior.

Verilog designs are built with components (representing one or more digital gates) connected via nets. A net represents a physical connection between components. A net of type "wire" may be driven by multiple drivers that may have different strengths. The value of a wire may be logical low, logical high, unknown logical value (e.g., if multiple drivers conflict), or high impedance (e.g., all drivers are in a tristate mode). Verilog includes standard component libraries, tools for defining new components, and a framework designed to import designs from additional files. Verilog tools allow reference to a Verilog Test Bench File, which is a text file often named with a ".vt" extension.

SUMMARY

In some examples, a non-transitory computer readable medium is provided comprising an analog information model (AIM) object class definition. The class definition comprises an instance data structure defining a net interface to a net defined in a simulated digital circuit, and a plurality of analog circuit properties. The class definition also comprises one or more methods comprising instructions that when executed on a computer processor identify all AIM instances connected to a first net defined in the simulated digital circuit, and determine an analog voltage at and current through the first net based on the analog circuit properties of all the identified AIM instances connected to the first net. In certain examples, the AIM object class definition includes a static data structure defining a comprehensive list of instances and a list associated with the first net. Also, the one or more methods comprising instructions that when executed on a computer processor, select a first instance in the comprehensive list of instances, assert a value on the first net corresponding to the net interface of the first instance through a first Verilog command, receive from a second Verilog command a connected instance determined by Verilog to be connected to the first net, and add a reference to the connected instance to the list associated with the first net. In some examples the AIM object class instance data structure defines a switch status and a reference to a second instance that is associated with a second net and the static data structure defines a list associated with the second net. The one or more methods comprises instructions that when executed on the computer processor and when the switch status is closed, merge the lists associated with the first and second nets. In certain examples, the net interface is compatible with a standard Verilog wire. In certain examples, the analog circuit properties include a type, a voltage, a current, a resistance, a capacitance, and a charge. In certain examples, the analog circuit properties comprise at least a minimum or maximum bound for at least one of the voltage, the current, and the resistance. The one or more methods comprise instructions that when executed on the computer processor identify an analog circuit property exceeding the minimum or maximum bound. In certain examples, the type may be a voltage source, a current source, a resistive load, or a capacitive load. The one or more methods comprise instructions that when executed on the computer processor simplify the instances in a list of instances of the analog information model object class associated with the first net including instructions to combine the resistance of each instance with type resistive load, combine the capacitance of each instance with type capacitive load, combine the internal resistance of each instance with type current source, and generate an equivalent voltage and resistance pair from the instances with type voltage source and the instances with type current source. In certain examples, the type may be a voltage source, a current source, a resistive load, or a capacitive load, and the one or more methods comprise instructions that when executed on the computer processor simplify the instances in the list associated with the first net including instructions to determine the voltage across each instance and determine the current through each node. In the one or more methods comprising instructions that when executed on the computer processor determine the analog voltage at, and current through, the first net comprise instructions to iterate until the current through the instances a list of instances of the analog information model object class associated with the first net with type capacitive load reaches zero.

In some examples, a computer-implemented method is provided including instantiating an object of an analog information model (AIM) object class definition defining a net interface to a net defined in a simulated digital circuit, and a plurality of analog circuit properties. The method includes connecting the net interface of the data structure to a first net defined in a digital circuit simulation and identifying all other instances of the AIM object class definition connected to the first net defined in the digital circuit simulation of a simulated digital circuit, and determining an analog voltage at and current through the first net based on the analog circuit properties of all instances connected to the first net. In certain examples, the computer implemented method includes initializing a static data structure defining a comprehensive list of instances and a list associated with the first net and selecting a first instance in the statically defined comprehensive list of instances, asserting a value on the net interface of the statically defined first instance through a first Verilog command, receiving from a second Verilog command a connected instance determined by Verilog to be connected to the net interface, and adding a reference to the connected instance to the list associated with the first net. In certain examples, the instance defines a switch status and a reference to a second instance that is associated with a second net. The static data structure defines a list associated with the second net. And when the switch status is closed, merging the lists associated with the first and second nets. In some examples, the net interface of the instance data structure is compatible with a standard Verilog wire. In some examples, the analog circuit properties of the instance data structure include a type, a voltage, a current, a resistance, a capacitance, and a charge. In certain examples, the analog circuit properties of the instance data structure comprise at least a minimum or maximum bound for at least one of the voltage, the current, and the resistance and the computer-implemented method comprises identifying an analog circuit property exceeding the minimum or maximum bound. In some examples, the type may be a voltage source, a current source, a resistive load, or a capacitive load. The computer implemented method also includes combining the resistance of each instance with type resistive load, combining the capacitance of each instance with type capacitive load, combining the internal resistance of each instance with type current source, and generating an equivalent voltage and resistance pair from the instances with type voltage source and the instances with type current source. In certain examples, the type may be a voltage source, a current source, a resistive load, or a capacitive load and the computer implemented method includes determining the voltage across each instance and determining the current through each node. In certain examples, the computer-implemented method comprises determining the analog voltage at, and current through, the first net iterates until the current through the instances a list of instances of the analog information model object class associated with the first net with type capacitive load reaches zero. In certain examples, the computer-implemented method comprises connecting a ground interface of the data structure to a ground defined in the digital circuit simulation and connecting a supply voltage interface of the data structure to a supply voltage defined in the digital circuit simulation. In certain examples, the computer-implemented method comprises connecting an analog ground interface of the data structure to an analog ground defined in the digital circuit simulation and connecting an analog supply voltage interface of the data structure to an analog supply voltage defined in the digital circuit simulation.

BRIEF DESCRIPTION OF THE DRAWINGS

FIG. 2 is an illustration of an example class definition, according to examples of the present disclosure.

FIGS. 3a-3d are illustrations of source code, according to examples of the present disclosure.

FIGS. 8a and 8b illustrate the use of multiple power supplies, according to examples of the present disclosure.

DETAILED DESCRIPTION

The present disclosure presents a vendor agnostic implementation of an analog information model (AIM) system that interoperates with a digital circuit simulation system such as those provided by MENTOR, CADENCE, and/or SYNOPSYS. Examples may use IEEE standard User Defined Nettypes (UDN) with flexibility to change UDN type at compile time. UDN types may be scalar real in some examples. In other examples, a more complex UDN type may be required to handle complex radio frequency circuits.

Figure 1:
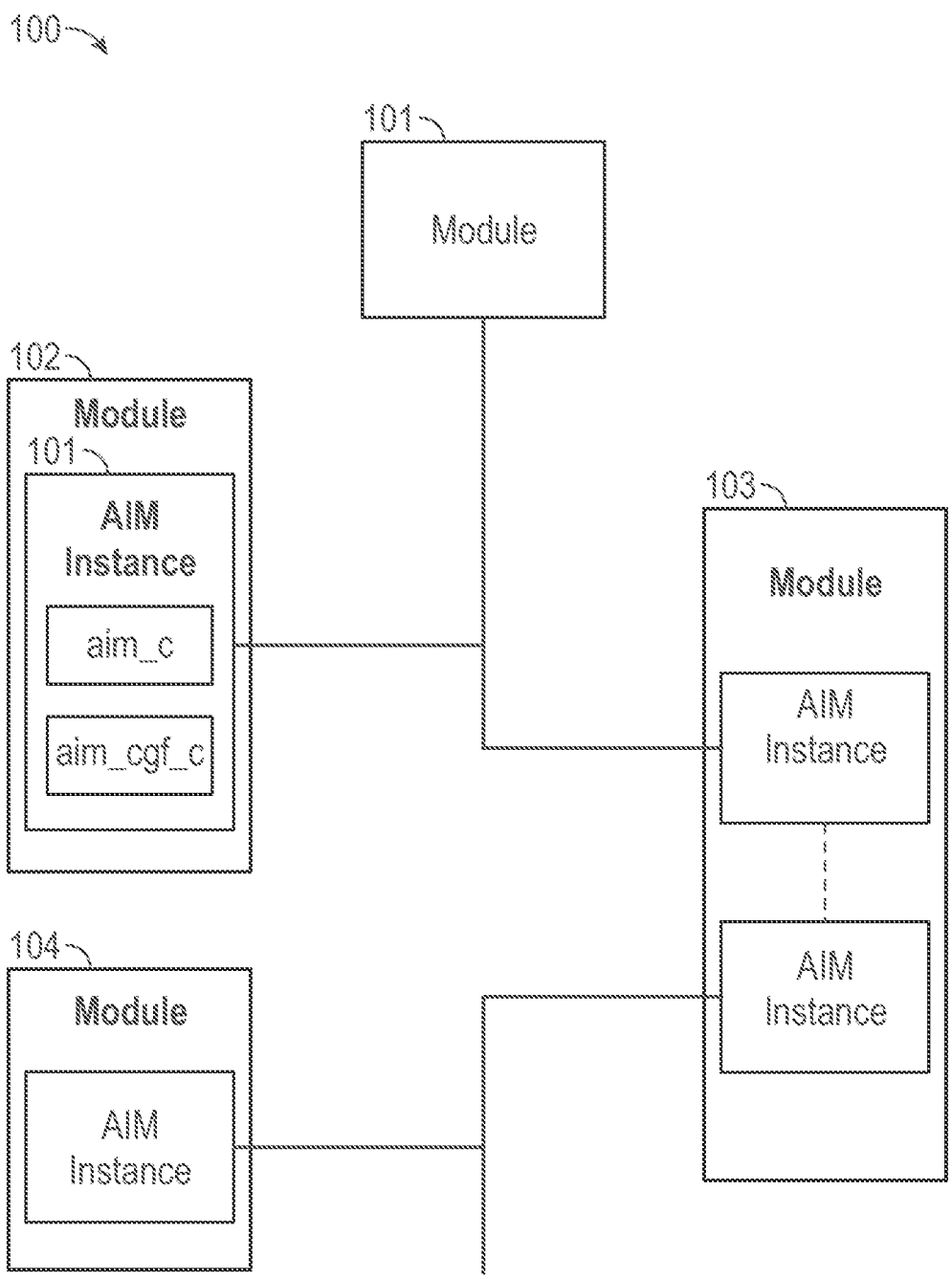
FIG. 1 is an illustration of an example Verilog extension, according to examples of the present disclosure.

FIG. 1 is an illustration of an example Verilog extension, according to examples of the present disclosure. System Verilog file aim_if.sv is a file defining the Analog Information Model (AIM) extension to a System Verilog circuit simulator. AIM defines object handles aim_c and aim_cfg_c. AIM connects to a System Verilog net.

FIG. 2 is an illustration of an example object model class definition, according to examples of the present disclosure. Class AIM 200 is a class definition in an object-oriented programming (OOP) language such as System Verilog. The AIM class definition includes a listing of static data and instance data, referred to as properties 210. One copy of static data exists in system memory and is common to all instances of the class. Instance data is created for each instance of the class. For example, a design might include a first instance of AIM representing a voltage source and a second instance of AIM representing a resistive load. Each instance would have its own set of instance data and would share any static data. The AIM class definition also includes a set of methods 230. A static method may be called without reference to an instance, and in that situation, the implementation will have direct access only to static properties. Non-static methods must be called in reference to a specific instance of the class and will have access to the instance properties of the class.

Properties 210 may be set or read through access methods. A set method may be used to initialize or update the value of a property. The set method may perform other related functions as appropriate. For example, setting a charge property of a capacitive element may also trigger a modification of the voltage property of that element.

Net interface id 211 identifies a net interface, which is an electrical connection to other circuit elements in a digital design to be simulated. A net may be a Verilog wire. Analog circuit element 212 may be, for example, a voltage source, a current source, a resistive element, a capacitive element, or some combination of analog circuit elements. Voltage 213 represents the voltage of analog circuit element 212. Current 214 represents the current flowing in or out of analog circuit element 212. Resistance 215 represents the resistance of analog circuit element 212. Inductance 216 represents the inductance of analog circuit element 212. Capacitance 217 represents the capacitance of analog circuit element 212. Charge 218 represents the charge state of a capacitive analog circuit element 212. Static array of AIM references 219 is static data with each element of the array referencing one and only one instance of the AIM class. In some examples, a net interface may connect to a wire, a real port, or a power rail (i.e., UPF as described below).

The static resolution method 231 implements the resolution function of the AIM class. The resolution method may walk through the static array of AIM references to determine what instance interfaces are connected and generate a list of unique nets in an analog circuit. The resolution method may determine the state of any switches in the circuit. If a switch is closed, the resolution method will treat the switch as a wire and the nets on each side of the switch will be merged, or treated as the same net. If a switch is open, the switch will be ignored. The static resolution method may also calculate the voltage of and current flowing through each net and the charge of any capacitive elements.

FIGS. 3a-3d are illustrations of source code, according to examples of the present disclosure. FIG. 3a illustrates code for instantiating the AIM class including initializing load and voltage source values and connecting nets. FIG. 3b illustrates code for driving AIM nets. FIG. 3c illustrates code for monitoring AIM properties. FIG. 3d illustrates code for initializing a new instance of the AIM class. References to "this" are references to instance data of the current instance. Reference to aim_nodes[0][node_name] is a reference to static data associated with the class.

Figure 4A:
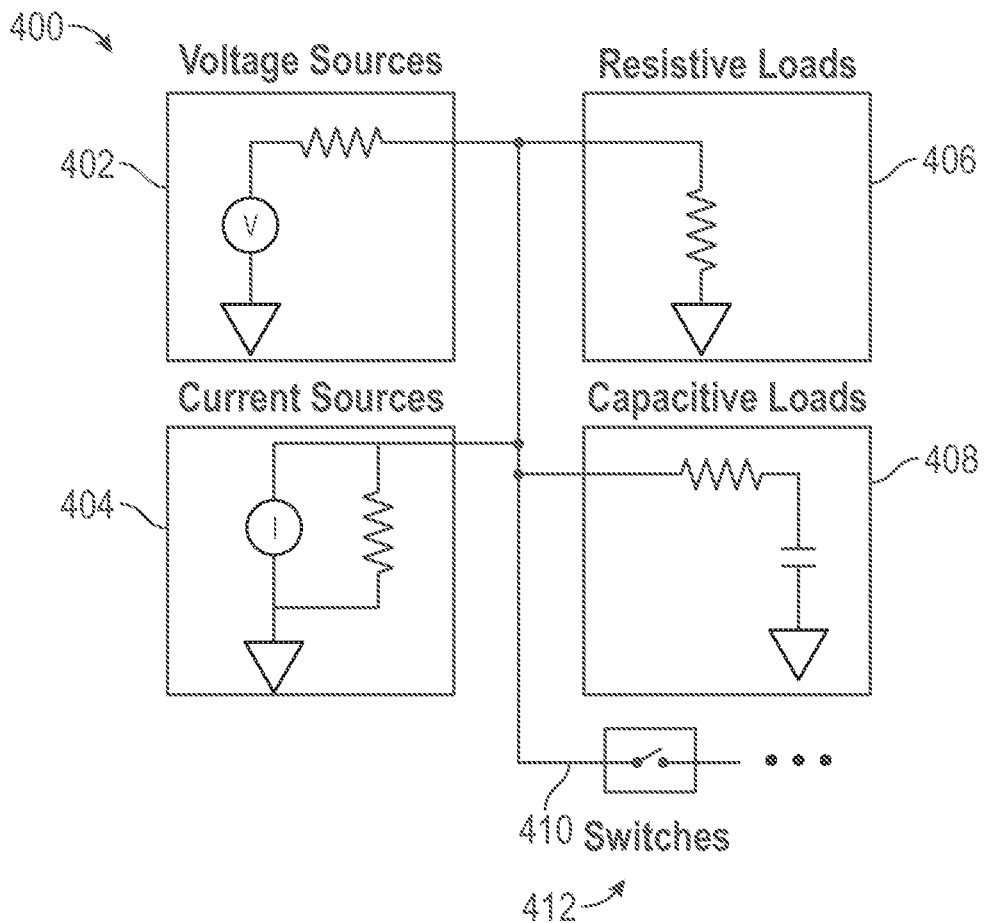
FIGS. 4a and 4b are illustrations of decomposing analog nets, according to examples of the present disclosure.
Figure 4B:
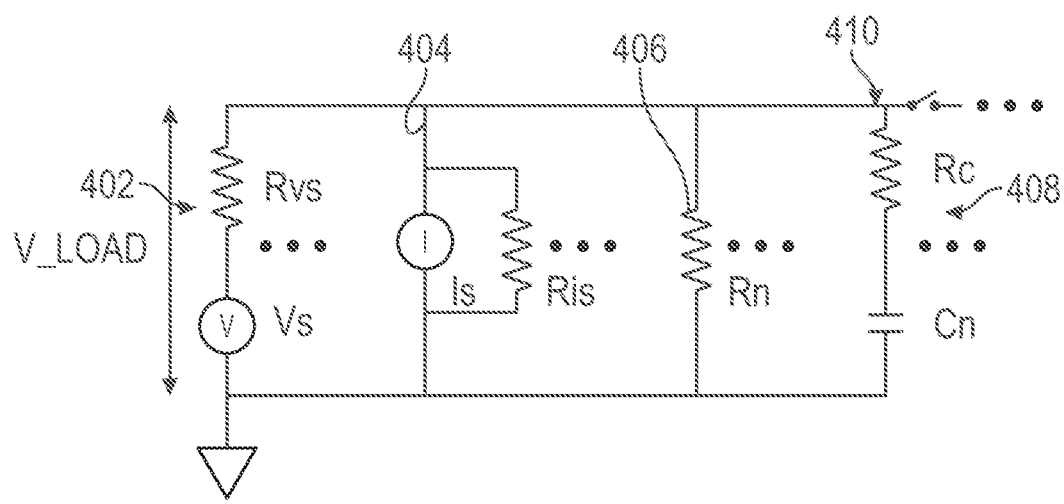

FIGS. 4a and 4b are illustrations of a method for decomposing analog nets, according to examples of the present disclosure. FIG. 4a illustrates circuit 400 including voltage source 402, current source 404, resistive load 406, and capacitive load 408, all connected to common net 410. Common net 410 has one voltage and one current. Switch 412 (shown open) represents a switch that (when closed) will connect common net 410 with another net (not shown). FIG. 4b illustrates circuit 450, which is functionally equivalent to circuit 400, but redrawn to show fully parallel circuits with a combined voltage V_LOAD across the parallel circuit.

FIG. 4b illustrates the same circuit illustrated with common net 410 across the top and each of voltage source 402, current source 404, resistive load 406, and capacitive load 408 illustrated as parallel circuits representing a system of linear equations to be solved.

Figure 5A:
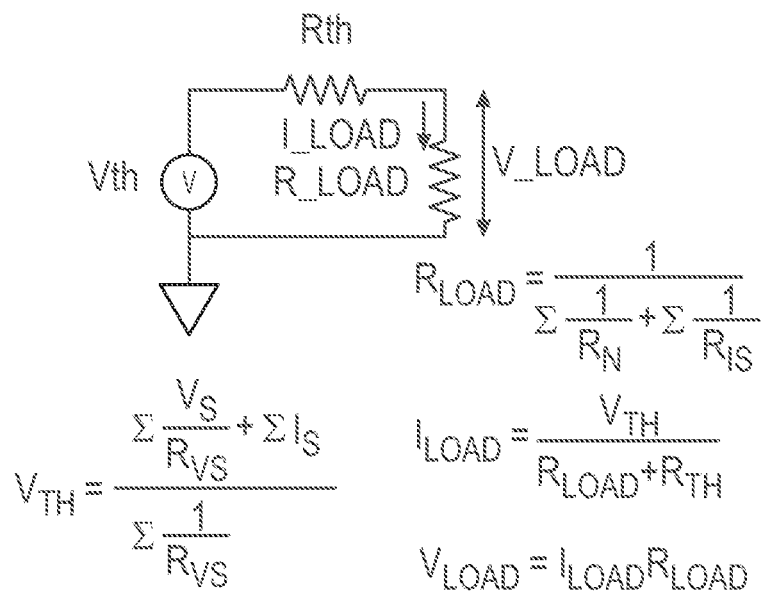
FIGS. 5a and 5b are illustrations of simplification of parallel circuits, according to examples of the present disclosure.
Figure 5B:
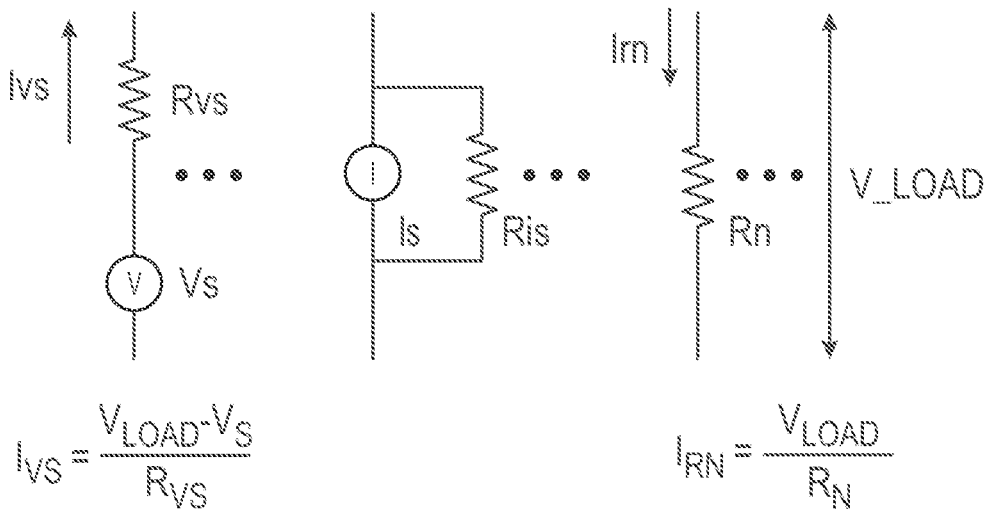

FIGS. 5a and 5b are illustrations of simplification of parallel circuits, according to examples of the present disclosure. Millman's Theorem may be used to simplify fully parallel circuits. Load and current source resistances can be combined. Voltage and current sources can be combined into a single Thevenin voltage and resistance. The calculated load voltage can then be used to calculate node voltages and currents.

Figure 6:
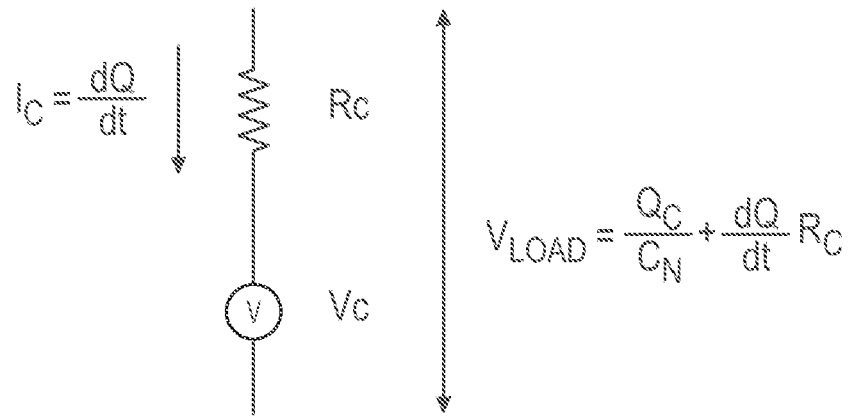
FIG. 6 is an illustration of an analysis of a capacitive load, according to examples of the present disclosure.

FIG. 6 is an illustration of an analysis of a capacitive load, according to examples of the present disclosure. Capacitive loads may be modelled as a voltage source based on its state of charge. This model allows dynamic source or sink of current based on other voltage/current sources on the net.

Figure 7A:
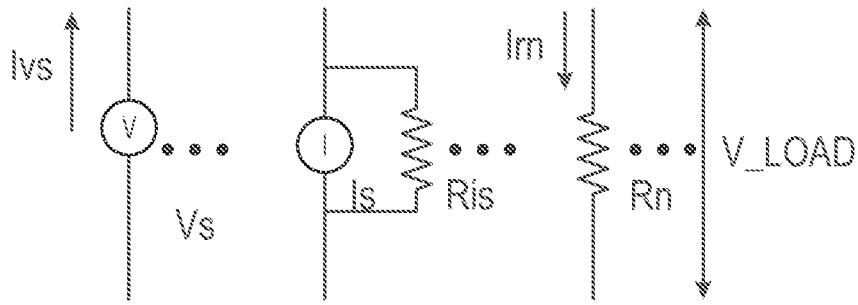
FIGS. 7a and 7b illustrate handling of ideal voltage sources, according to examples of the present disclosure.
Figure 7B:
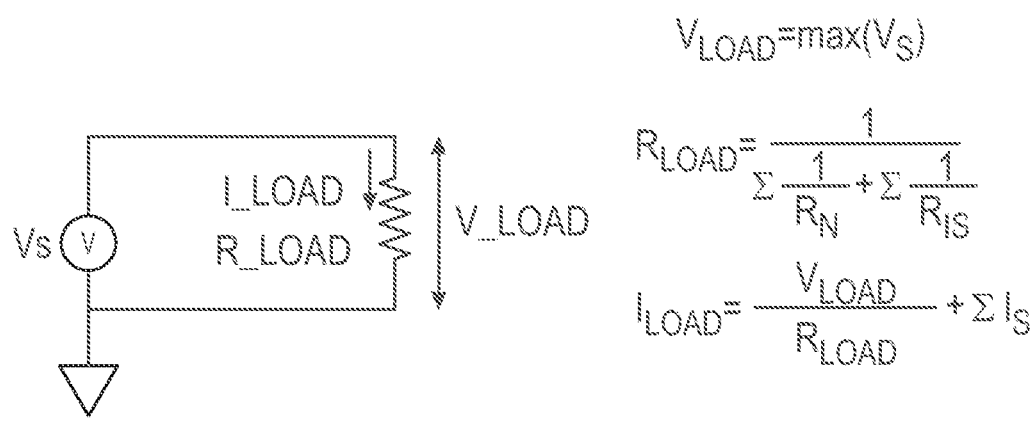

FIGS. 7a and 7b illustrate handling of ideal voltage sources, according to examples of the present disclosure. Ideal voltage sources may overwhelm other voltage sources, especially maximum ideal sources. Capacitive loads are eliminated.

FIGS. 8a and 8b illustrate the use of multiple power supplies, according to examples of the present disclosure. Complex systems on a chip (SoC) architectures may operate at different voltage levels during different operational modes and multiple voltage supply levels may be provided for different portions of the circuit at a given time. In some examples, a digital design may include unified power format (UPF) information to specify power rails, routing, identification of blocks to be powered up or down, power domains, and special treatment of registers and memory cells under low power conditions. Power aware register transfer level (RTL) simulations may simulate operations under various power conditions and modes. In some examples, Synopsis VC LP™ or Design Compiler™ may be used to extract UPF connectivity information into a YAML file as illustrated in FIG. 8a. System Verilog code may be generated to connect the power supplies using the Jinja™ template engine as illustrated in FIG. 8b. Power supplies connect with AIM nodes using Verilog wires.

Analog Power Models (APM) may be used to model the load characteristics of digital blocks including digital capacitance, leakage current, dynamic current, and/or logic corruption. APMs may model digital circuits at the block level, subsystem level, or power domain level. APMs may be used in digital simulations. APMs may be used in SoC cosimulations. APM may be bound to the digital design code for reuse and for white-box testing.

Figure 9:
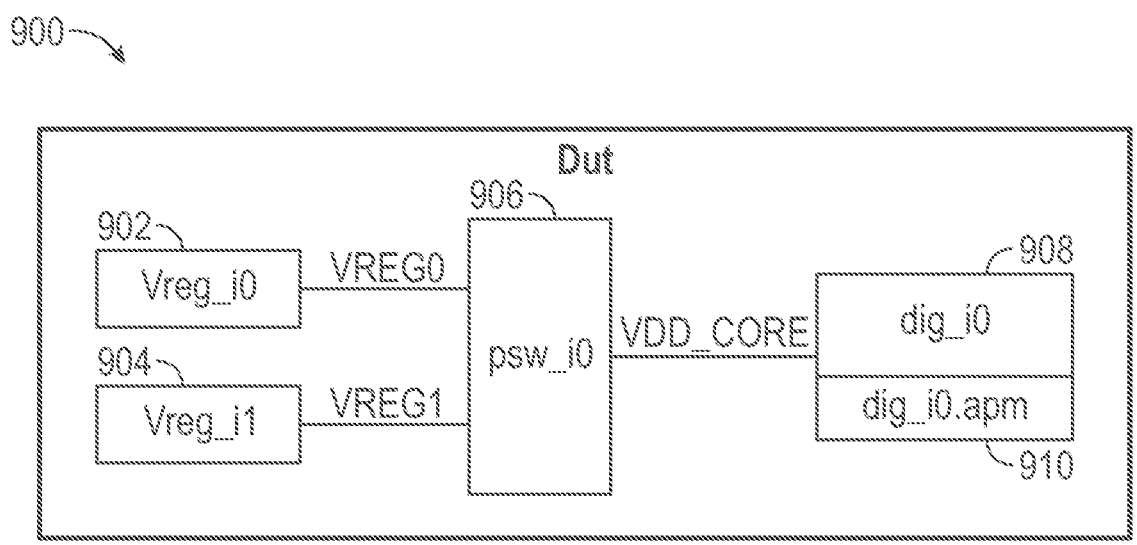
FIG. 9 illustrates an example analog circuit, according to examples of the present disclosure.

FIG. 9 illustrates an example analog circuit, according to examples of the present disclosure. Design under test (DUT) 900 is modeled with voltage regulators 902 and 904 connected to inputs of power switch 906. The output of power switch 906 is connected to digital block 908 via corresponding APM 910. In this example, DUT 900 may be simulated in four scenarios:
1. At power up, both voltage regulators on and passed through power switch 906
2. Enable digital block 908 to consume current through APM 910
3. Disconnect voltage regulator 902 in PSW 906 (i.e., all current to digital block 908 is supplied by voltage regulator 904)
4. Disconnect voltage regulator 904 in PSW 906 (i.e., capacitor in APM discharges)

Figure 10A:
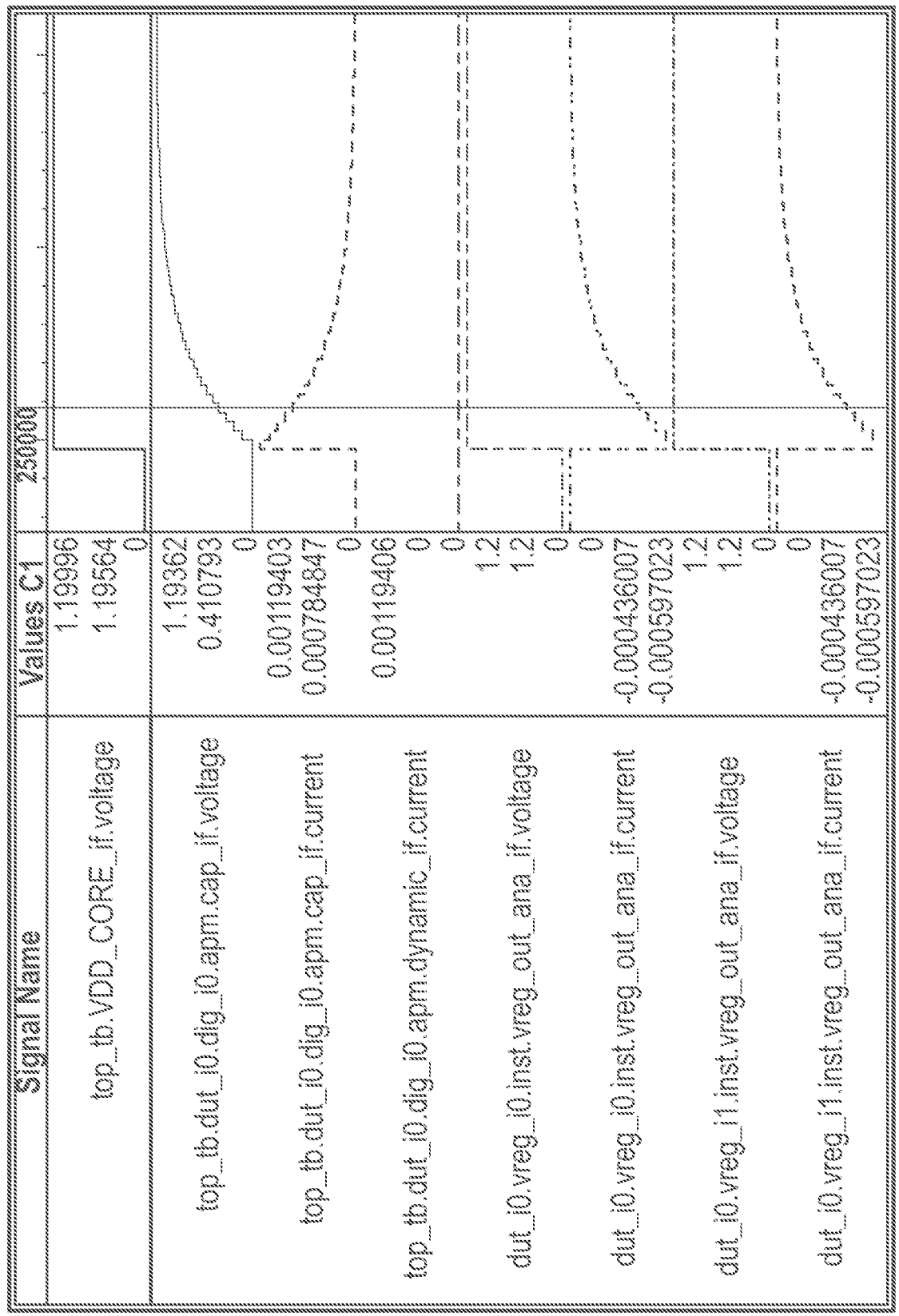
FIGS. 10a-10d illustrate simulation data, according to examples of the present disclosure.

FIGS. 10a-10d illustrate simulation data, according to examples of the present disclosure. FIG. 10a illustrates Scenario 1. The ".voltage" property is the voltage on the voltage source, not the load voltage. Positive current is current flowing to the node and negative current is flowing out of the node. No dynamic current is consumed by APM 910 (because digital block 908 is disabled). Current load is split between two regulators through PSW 906.

Figure 10B:
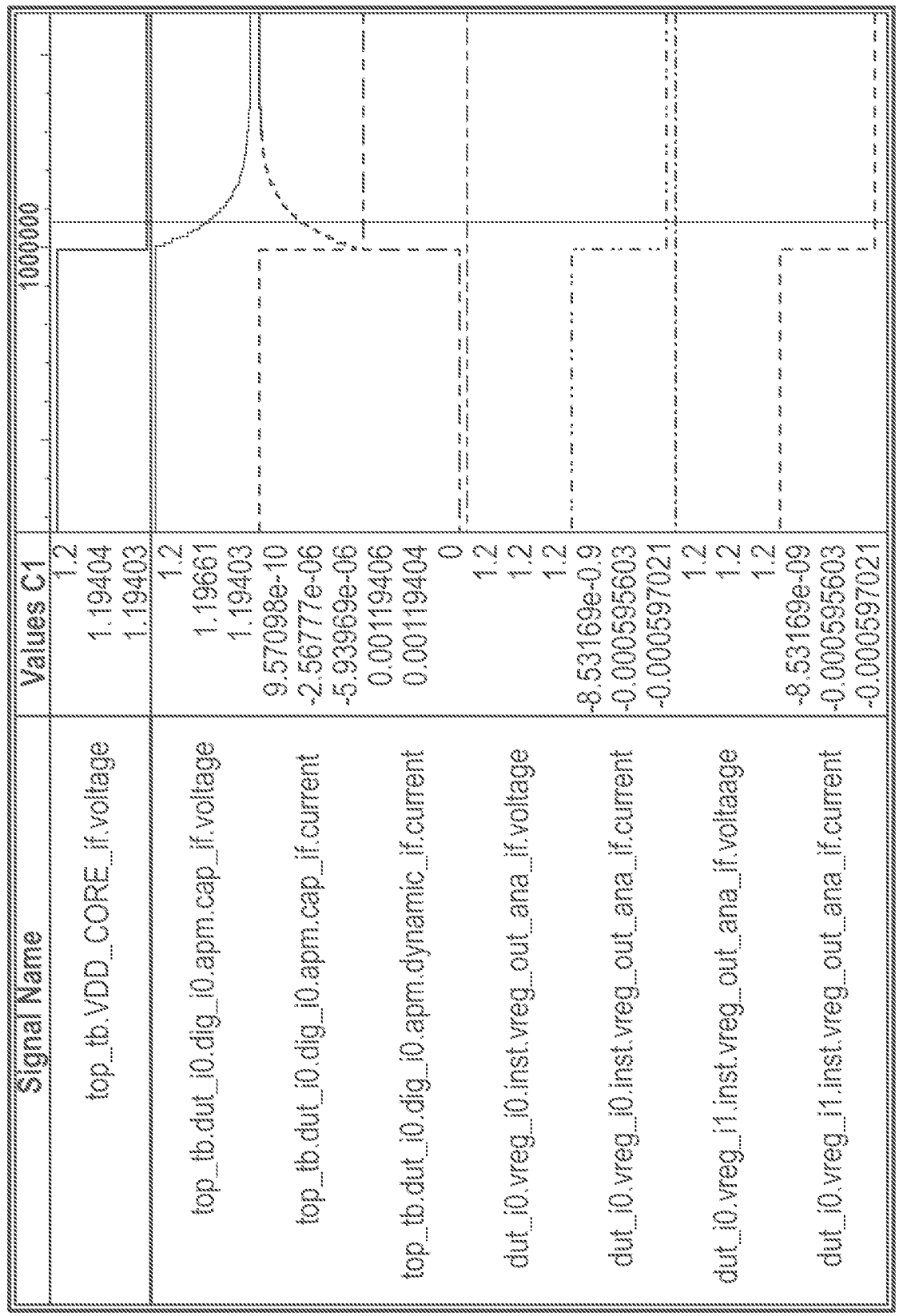

FIG. 10b illustrates Scenario 2. Dynamic current into APM 910 increases to approximately 1200 uA into APM 910, approximately 600 uA from each regulator. Load voltage (VDD_CORE) drops by a few mV because of the drop across the regulator source impedances. A capacitor in the APM compensates for the voltage drop.

Figure 10C:
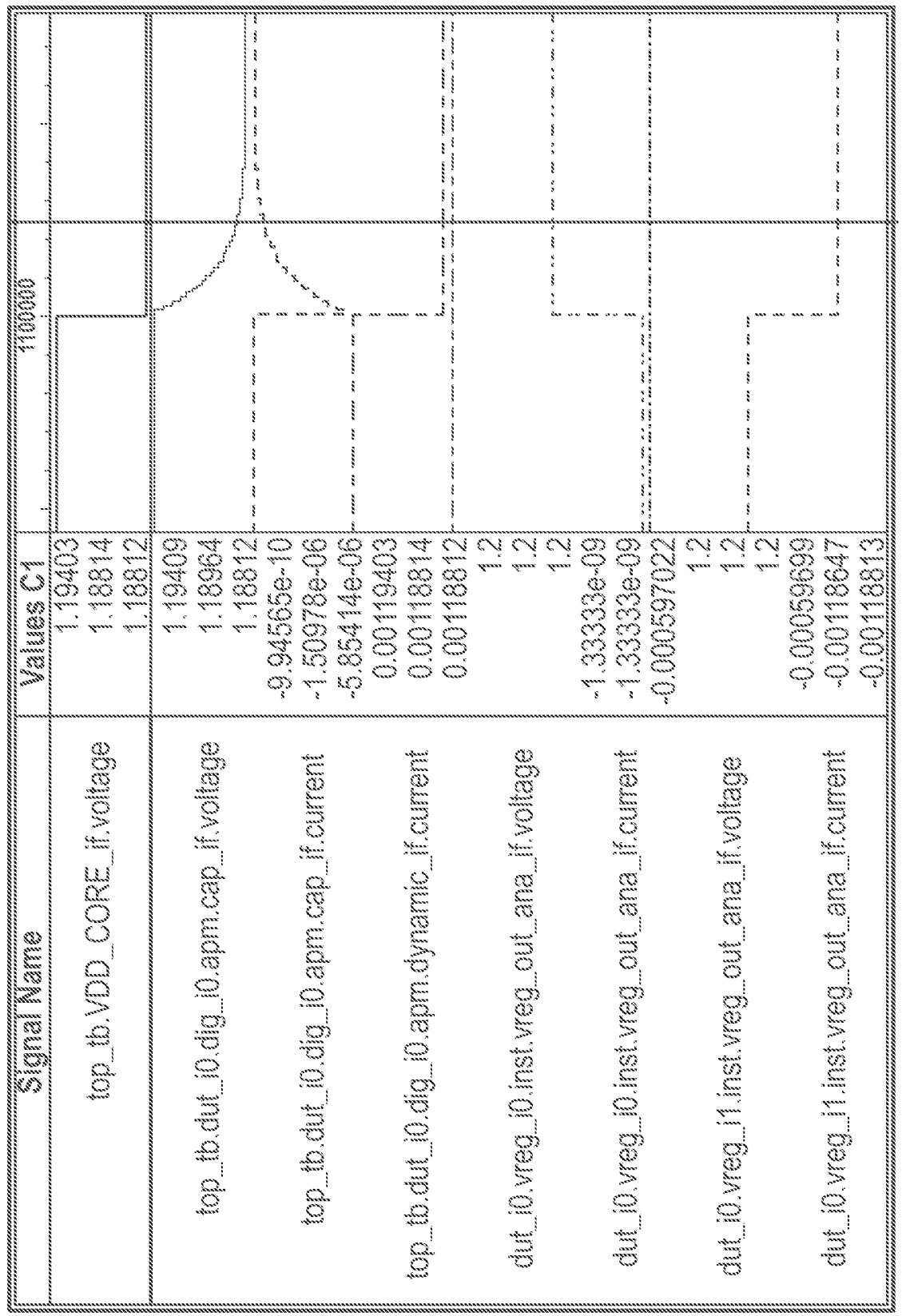

FIG. 10c illustrates Scenario 3. Current from voltage regulator 902 drops to the nA range. Current from voltage regulator 904 increases to compensate. Load voltage (VDD_CORE) drops further to account for increased source impedance.

Figure 10D:
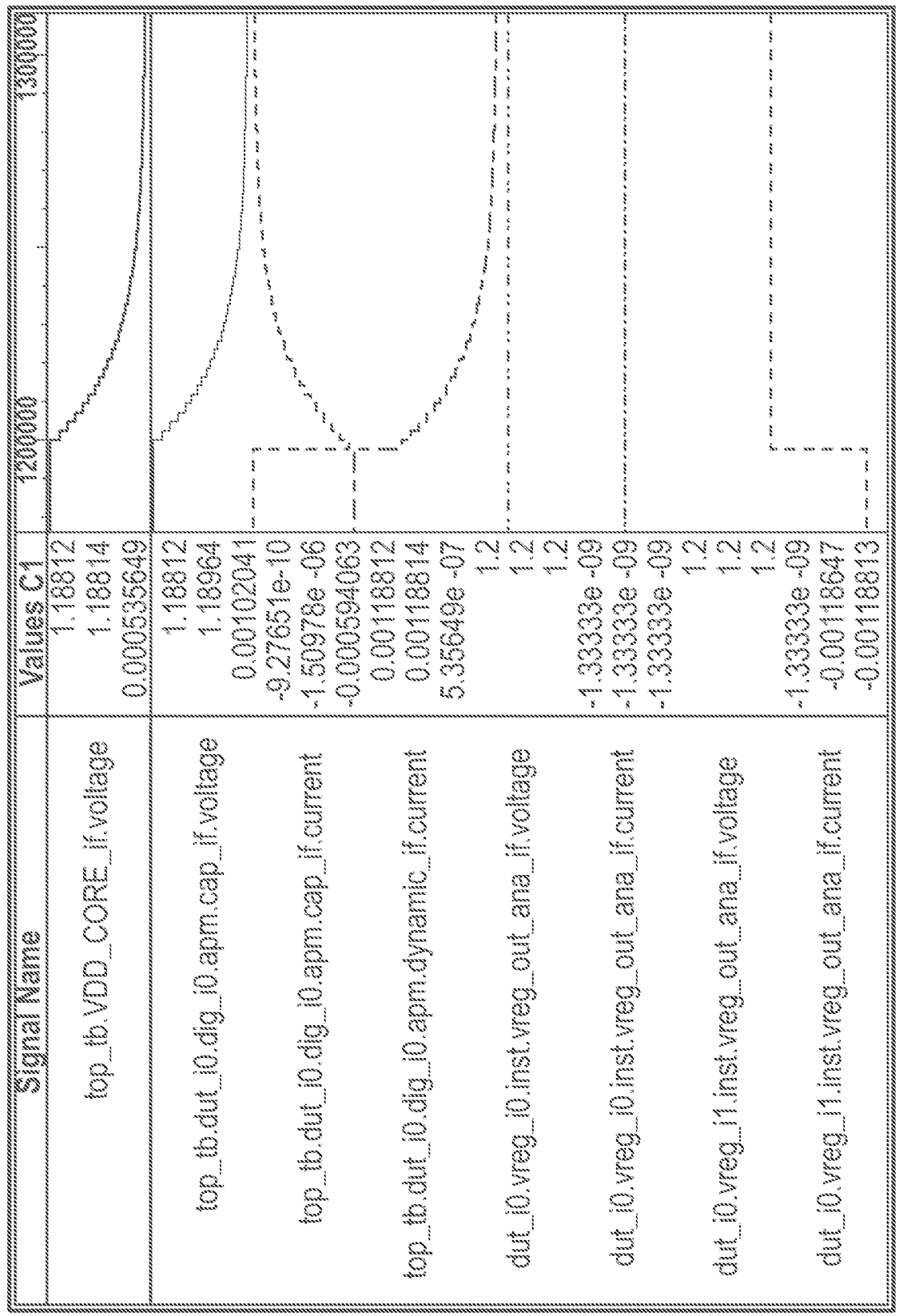

FIG. 10d illustrates Scenario 4. Neither voltage regulator supplying power at the load voltage (VDD_CORE). Capacitor in APM 910 discharges and drops the rail voltage. Below a minimum voltage threshold, APM will corrupt the logic in logic block 908.

AIM may provide certain capabilities. The AIM model may next to UPF supply nets rather than hijack the net. AIM voltage values may be sent to or from the UPF information model. AIM may model digital block capacitor discharge and hold core logic state while switching power states. AIM may more accurately simulate analog aspects of circuits by utilizing the UPF supply network. AIM may model current consumption and corrupt supply nets in over-draw scenarios. This capability may be useful in simulations of multiple sleep modes, power switching, and power-up.

Figure 11:
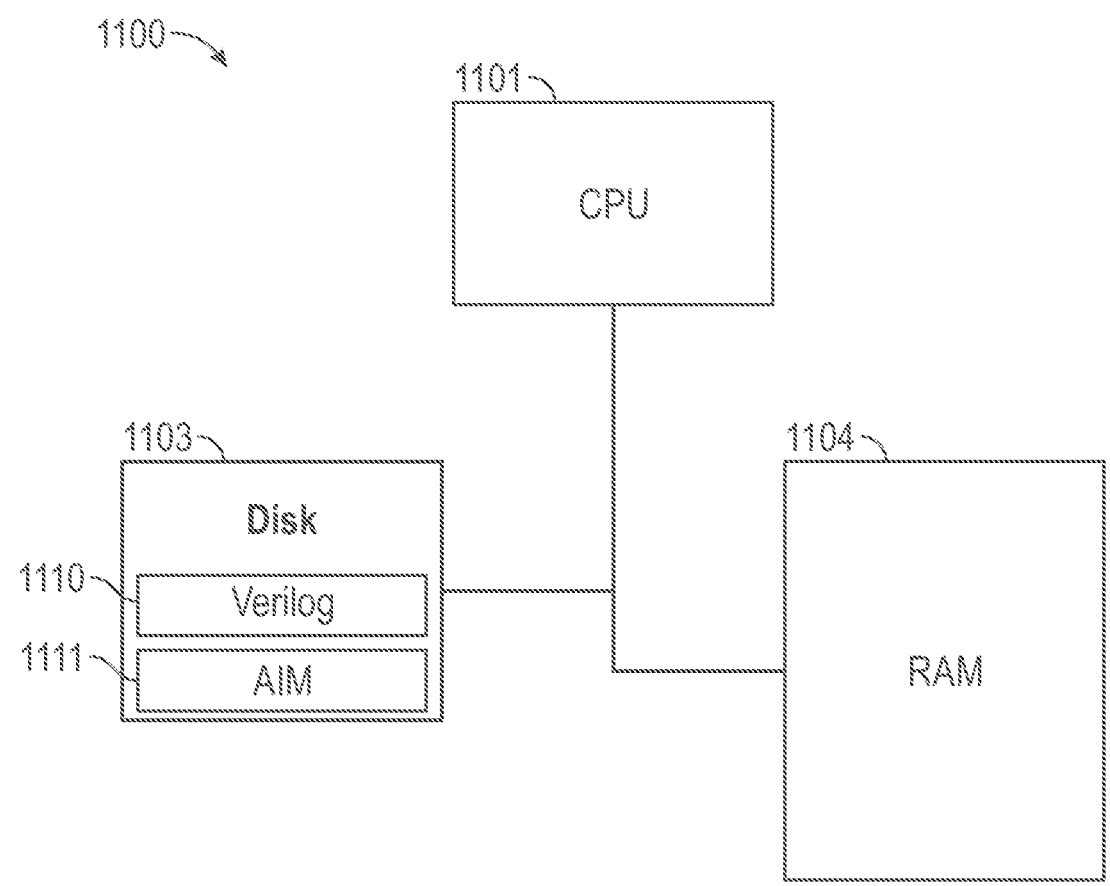
FIG. 11 illustrates a simulation computer system, according to examples of the present disclosure.

FIG. 11 illustrates a simulation computer system, according to examples of the present disclosure. System 1100 includes central processing unit (CPU) 1101, disk 1103, and random access memory (RAM) 1104. CPU 1101 may be a standard Intel™ x86 processor, Apple M1™, or other general purpose processor. Disk 1103 may be a non-transitory, non-volatile computer readable medium such as a hard drive or solid-state disk. Disk 1103 includes digital circuit simulation software 1110 (e.g., Verilog HDL) and Analog Information Model (AIM) software 1111. AIM software 1111 includes a class definition for the AIM class (e.g., class AIM 200 in FIG. 2). AIM software may include additional class definitions. For example, AIM software may include a subclass of the AIM class with additional properties or overrides for one or more of the AIM software methods.

Figure 12:
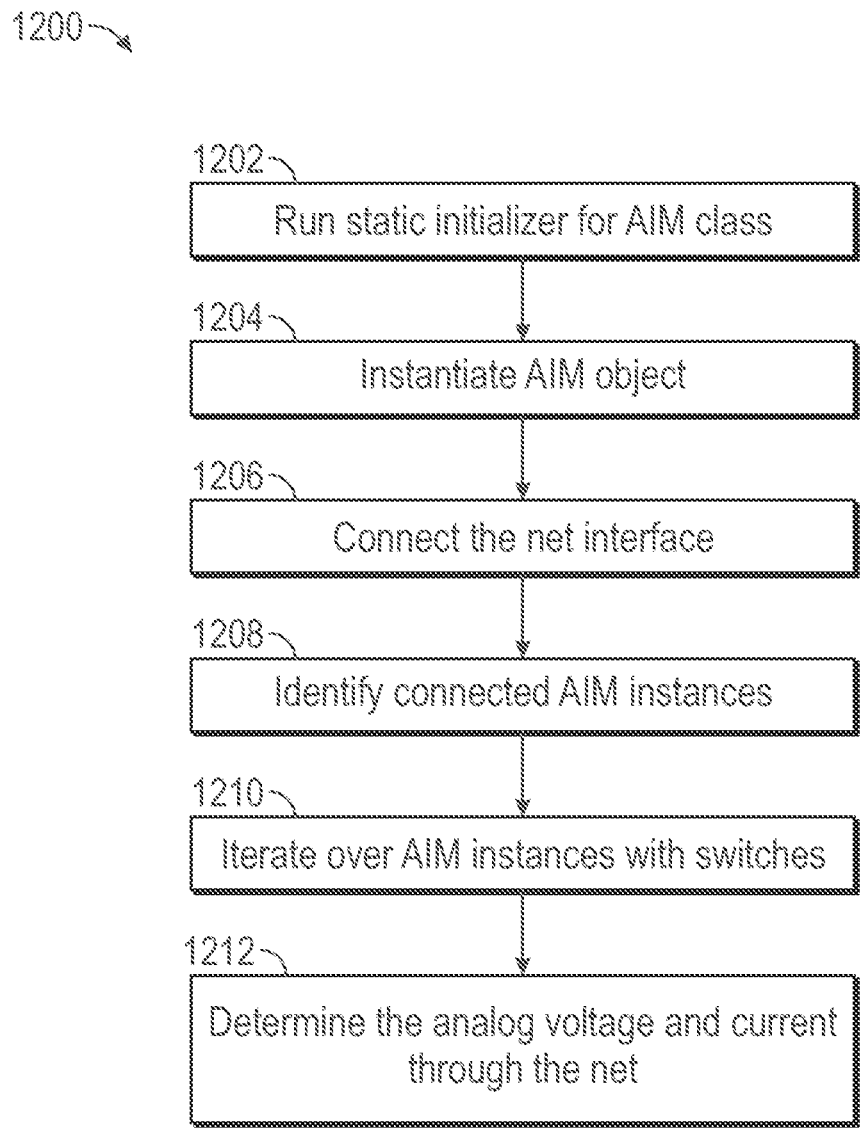
FIG. 12 illustrates a computer implemented simulation method, according to examples of the present disclosure.

FIG. 12 illustrates a computer implemented simulation method, according to examples of the present disclosure. Method 1200 begins at block 1202 when a digital circuit simulator loads the AIM object class definition, for example when loading an extension file referencing or defining the AIM object class definition. The method allocates storage for static properties and executes the static initializer for the analog information model object class. The static array of AIM references is initialized to an empty array. If the method is loading a subclass of the AIM object class definition additional static properties may be present. The method may also invoke a static initializer method in block 1202.

At block 1204, the method instantiates an AIM object, for example when the method invokes the new( ) method. The method allocates storage for instance properties, such as properties 211-243, and may initialize these instance properties with default values or values specified as arguments to the new( ) method. In some examples, the last step of the new( ) method is a call to the static resolution( ) method of the AIM object class definition.

At block 1206, the method connects the net interface of the AIM instance to a net in a digital simulation model. In some examples, the AIM instance is selectively connected to a second net in the digital simulation model. This selective connection may be implemented with a virtual switch.

At block 1208, the method identifies connected AIM instances, for example, by calling static resolution method 231. At block 1210, the method iterates over all AIM instances containing switches and performs the resolution method with the switch open and closed to map the possible connections in the network.

At block 1212, the method determines the analog voltage and current through the net.

Figure 13:
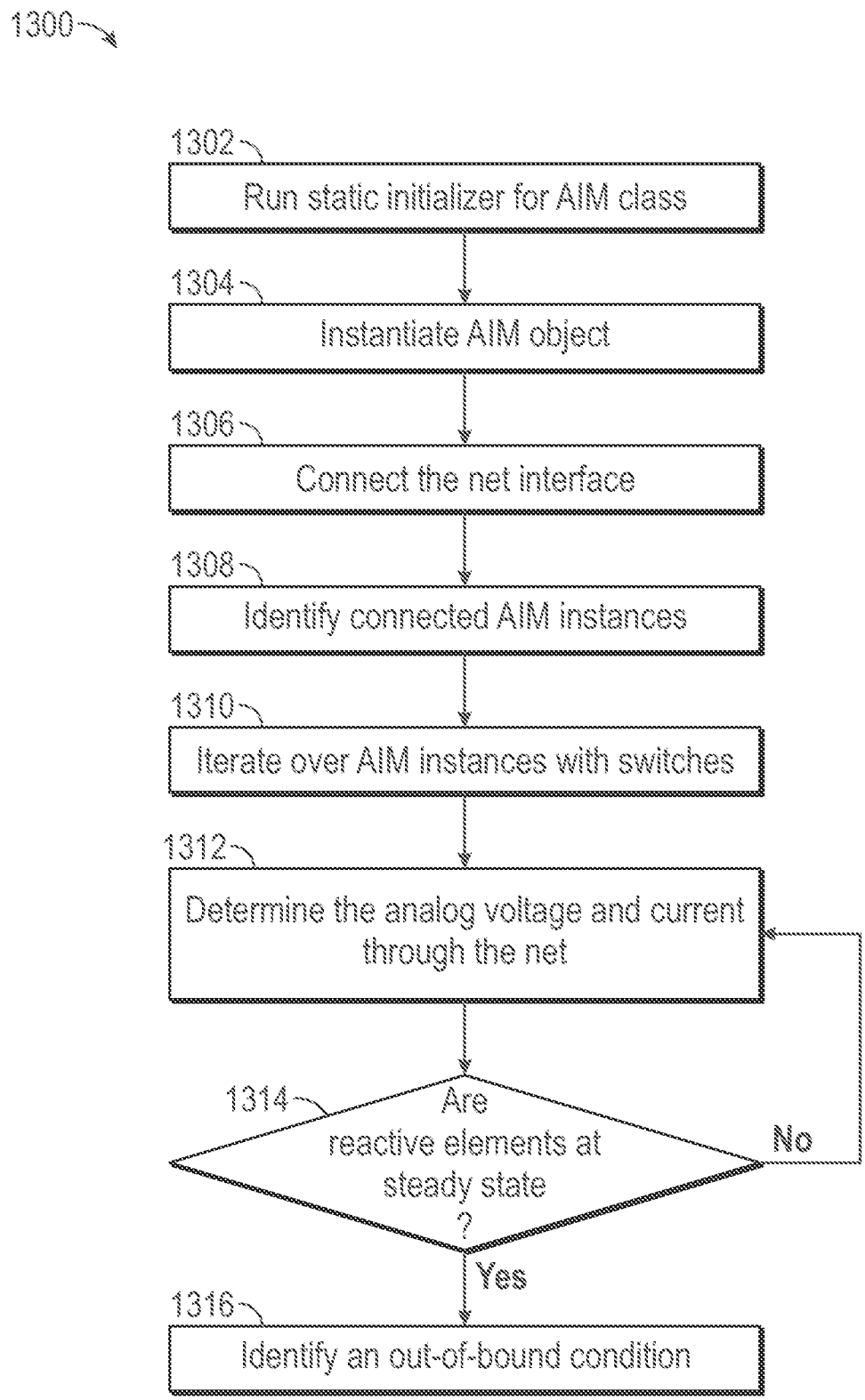
FIG. 13 illustrates a computer implemented simulation method, according to examples of the present disclosure.

FIG. 13 illustrates a computer implemented simulation method, according to examples of the present disclosure. Method 1300 begins at block 1302 when a digital circuit simulator loads the AIM object class definition, for example when loading an extension file referencing or defining the AIM object class definition. The method allocates storage for static properties and executes the static initializer for the analog information model object class. The static array of AIM references is initialized to an empty array. If the method is loading a subclass of the AIM object class definition additional static properties may be present. The method may also invoke a static initializer method in block 1302.

At block 1304, the method instantiates an AIM object, for example when the method invokes the new( ) method. The method allocates storage for instance properties, such as properties 211-243, and may initialize these instance properties with default values or values specified as arguments to the new( ) method. In some examples, the last step of the new( ) method is a call to the static resolution ( ) method of the AIM object class definition.

At block 1306, the method connects the net interface of the AIM instance to a net in a digital simulation model. In some examples, the AIM instance is selectively connected to a second net in the digital simulation model. This selective connection may be implemented with a virtual switch.

At block 1308, the method identifies connected AIM instances, for example, by calling static resolution method 231. At block 1310, the method iterates over all AIM instances containing switches and performs the resolution method with the switch open and closed to map the possible connections in the network.

At block 1312, the method determines the analog voltage and current through the net. At block 1314, the method returns to block 1312 if any AIM instances include reactive elements such as capacitors or inductors that are not in a steady state. For example, if an AIM instance includes a non-zero capacitive load, the method will return to block 1312. At block 1316, the method checks AIM instances against boundary conditions, for example min/max values 241-243. If a boundary condition is exceeded, the method may, for example, raise an exception to interrupt the simulation. In another example, the method may log the out-of-bounds condition for offline analysis.

Although example embodiments have been described above, other variations and embodiments may be made from this disclosure without departing from the spirit and scope of these embodiments.

What is claimed is:

1. A non-transitory computer readable medium comprising an analog information model (AIM) object class definition, the class definition comprising:
   an instance data structure defining:
      a net interface to a net defined in a simulated digital circuit, and
      a plurality of analog circuit properties;
   one or more methods comprising instructions that when executed on a computer processor:
      identify all AIM instances connected to a first net defined in the simulated digital circuit, and
      determine an analog voltage at and current through the first net based on the analog circuit properties of all the identified AIM instances connected to the first net.

2. The non-transitory computer readable medium of claim 1, wherein the AIM object class definition further comprising:
   a static data structure defining:
      a comprehensive list of instances, and
      a list associated with the first net; and
   the one or more methods comprising instructions that when executed on a computer processor:
      select a first instance in the comprehensive list of instances,
      assert a value on the first net corresponding to the net interface of the first instance through a first Verilog command,
      receive from a second Verilog command a connected instance determined by Verilog to be connected to the first net, and
      add a reference to the connected instance to the list associated with the first net.

3. The non-transitory computer readable medium of claim 1, wherein
the AIM object class instance data structure further defining:
a switch status, and
a reference to a second instance that is associated with a second net;
the static data structure defining:
a list associated with the second net; and
the one or more methods further comprising instructions that when executed on the computer processor:
when the switch status is closed, merge the lists associated with the first and second nets.

4. The non-transitory computer readable medium of claim 1, wherein the net interface is compatible with a standard Verilog wire.

5. The non-transitory computer readable medium of claim 1, wherein the analog circuit properties comprise:
a type,
a voltage,
a current,
a resistance,
a capacitance, and
a charge.

6. The non-transitory computer readable medium of claim 5, wherein:
the analog circuit properties further comprise at least a minimum or maximum bound for at least one of the voltage, the current, and the resistance; and
the one or more methods further comprising instructions that when executed on the computer processor:
identify an analog circuit property exceeding the minimum or maximum bound.

7. The non-transitory computer readable medium of claim 5, wherein the type is a voltage source, a current source, a resistive load, or a capacitive load, and wherein:
the one or more methods further comprising instructions that when executed on the computer processor simplify the instances in a list of instances of the analog information model object class associated with the first net including instructions to:
combine the resistance of each instance with type resistive load,
combine the capacitance of each instance with type capacitive load,
combine the internal resistance of each instance with type current source, and
generate an equivalent voltage and resistance pair from the instances with type voltage source and the instances with type current source.

8. The non-transitory computer readable medium of claim 5, wherein the type is a voltage source, a current source, a resistive load, or a capacitive load, and wherein:
the one or more methods further comprising instructions that when executed on the computer processor simplify the instances in the list associated with the first net including instructions to:
determine the voltage across each instance, and
determine the current through each node.

9. The non-transitory computer readable medium of claim 5 wherein the one or more methods further comprise instructions that when executed on the computer processor determine the analog voltage at, and current through, the first net comprise instructions to iterate until the current through the instances a list of instances of the analog information model object class associated with the first net with type capacitive load reaches zero.

10. A computer-implemented method comprising:
instantiating an object of an analog information model (AIM) object class definition defining:
a net interface to a net defined in a simulated digital circuit, and
a plurality of analog circuit properties; and
connecting the net interface of the data structure to a first net defined in a digital circuit simulation;
identifying all other instances of the AIM object class definition connected to the first net defined in the digital circuit simulation, and
determining an analog voltage at and current through the first net based on the analog circuit properties of all instances connected to the first net.

11. The computer-implemented method of claim 10,
initializing a static data structure further defining:
a comprehensive list of instances, and
a list associated with the first net; and
selecting a first instance in the statically defined comprehensive list of instances,
asserting a value on the net interface of the first instance through a first Verilog command,
receiving from a second Verilog command a connected instance determined by Verilog to be connected to the net interface, and
adding a reference to the connected instance to the statically defined list associated with the first net.

12. The computer-implemented method of claim 11,
wherein the instance defines:
a switch status, and
a reference to a second instance that is associated with a second net;
wherein the static data structure defines:
a list associated with the second net; and
the method further comprising, when the switch status is closed, merging the lists associated with the first and second nets.

13. The computer-implemented method of claim 10, wherein the net interface of the instance data structure is compatible with a standard Verilog wire.

14. The computer-implemented method of claim 10, wherein the analog circuit properties of the instance data structure comprise:
a type,
a voltage,
a current,
a resistance,
a capacitance, and
a charge.

15. The computer-implemented method of claim 14,
wherein the analog circuit properties of the instance data structure further comprise at least a minimum or maximum bound for at least one of the voltage, the current, and the resistance; and
the computer-implemented method further comprises identifying an analog circuit property exceeding the minimum or maximum bound.

16. The computer-implemented method of claim 14, wherein the type is a voltage source, a current source, a resistive load, or a capacitive load, the method further comprising:
combining the resistance of each instance with type resistive load,
combining the capacitance of each instance with type capacitive load,
combining the internal resistance of each instance with type current source, and generating an equivalent voltage and resistance pair from the instances with type voltage source and the instances with type current source.

17. The computer-implemented method of claim 14, wherein the type is a voltage source, a current source, a resistive load, or a capacitive load, the method further comprising:
  determining the voltage across each instance, and
  determining the current through each node.

18. The computer-implemented method of claim 14, further comprising:
  wherein determining the analog voltage at, and current through, the first net includes iterating until the current through the instances a list of instances of the analog information model object class associated with the first net with type capacitive load reaches zero.

19. The computer-implemented method of claim 10, wherein the net interface of the data structure further comprises a ground interface and a supply voltage interface, the method further comprising:
  connecting the ground interface of the data structure to a ground defined in the digital circuit simulation; and
  connecting the supply voltage interface of the data structure to a supply voltage defined in the digital circuit simulation.

20. The computer-implemented method of claim 10, wherein the net interface of the data structure further comprises an analog ground interface and an analog supply voltage interface, and the method further comprising:
  connecting the analog ground interface of the data structure to an analog ground defined in the digital circuit simulation; and
  connecting the analog supply voltage interface of the data structure to an analog supply voltage defined in the digital circuit simulation.

* * * * *